350-276
July 20, 1943.   F. A. BRUNSON   2,324,469
ANTIGLARE DEVICE
Filed Jan. 18, 1941
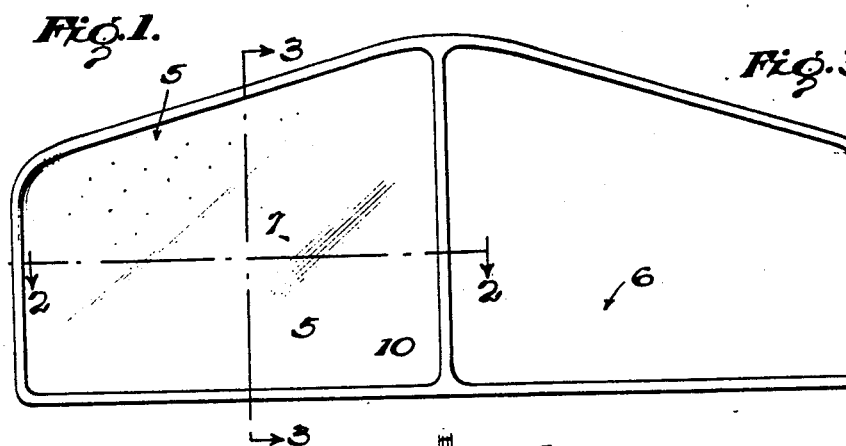
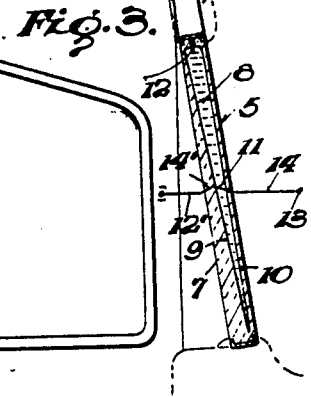
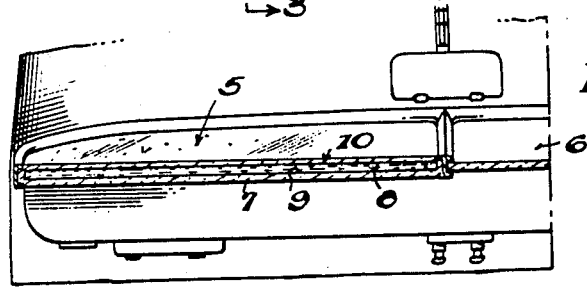
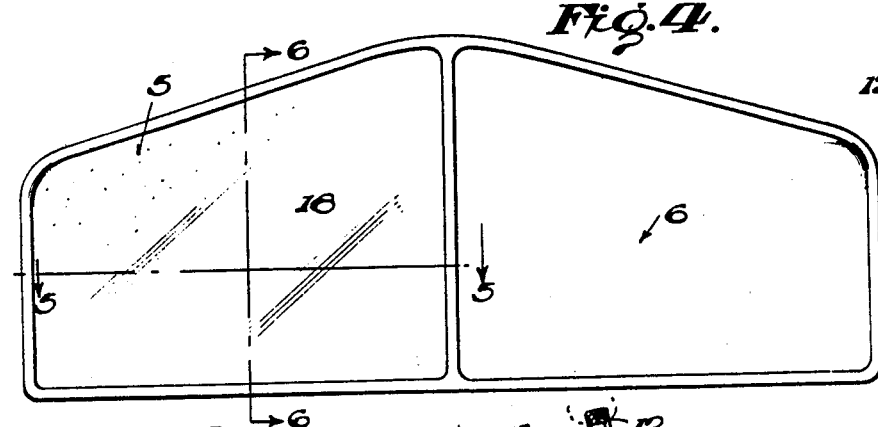
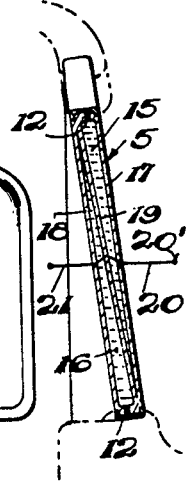
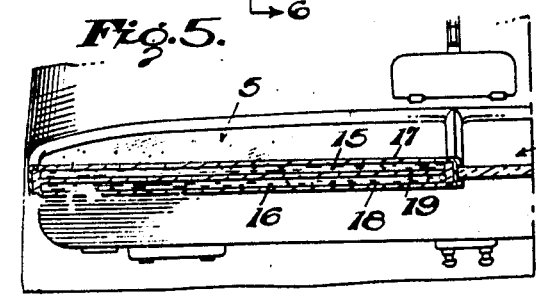
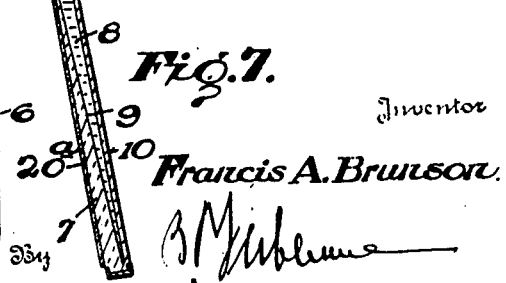
Inventor
Francis A. Brunson.
By
Attorney Patented July 20, 1943

2,324,469

UNITED STATES PATENT OFFICE 2,324,469

ANTIGLARE DEVICE

Francis A. Brunson, Sumter, S. C.

Application January 18, 1941, Serial No. 375,072

3 Claims. (Cl. 88—1)

My invention relates to anti-glare devices for eliminating the glare or blinding effect from a source of light.

An important object of the invention is to provide a device of the above-mentioned character which is adapted for use upon vehicles, such as automobiles, to eliminate the blinding effect of the headlights of an approaching vehicle.

A further object of the invention is to provide a device of the above-mentioned character which will eliminate the glare or blinding effect of a source of light by producing a spectrum without materially causing a deviation of the object or source of light.

A further object of the invention is to provide a device of the above-mentioned character which is at all times transparent and will not produce a blind spot.

If an object or source of light is viewed through a solid glass prism having a sufficiently high index of refraction, a spectrum will be produced, but the object is so deviated that such a prism would not be used safely under many circumstances, such as upon an automobile. If another prism having the same refractive index is superposed upon the first prism in inverted relation the deviation of the object will be corrected but the spectrum is eliminated and the object will appear as a white light. The same blinding effect would therefore be produced from the object or source of light.

I have discovered that if a liquid prism is arranged in inverted superposed relation with a solid glass prism or with another liquid prism, and if the prisms have proper indices of refraction that a spectrum will be produced which will pass as such from the superposed prisms and there will be relatively little deviation of the object. This renders it possible to utilize such superposed prisms as an anti-glare device for an automobile, since the spectrum will be produced and maintained thereby eliminating the glare or blinding effect of the object or source of light and the slight deviation of the object will not render it dangerous to the driver. The device is transparent and the object may be properly viewed through the same during the driving operation of an automobile, without the necessity of shifting the head.

In the accompanying drawing forming a part of this application and in which like numerals are employed to designate like parts throughout the same, Figure 1 is a rear side elevation of a windshield embodying my invention, Figure 2 is a horizontal section taken on line 2—2 of Figure 1, Figure 3 is a vertical transverse section taken on line 3—3 of Figure 1, Figure 4 is a rear side elevation of a modified form of the invention, Figure 5 is a horizontal section taken on line 5—5 of Figure 4, Figure 6 is a vertical section taken on line 6—6 of Figure 4, and, Figure 7 is a transverse vertical section through a mirror embodying my invention.

In Figures 1 to 3 inclusive, the windshield is shown as formed in sections 5 and 6. One or both sections may be provided with the anti-glare device, but for the purpose of illustration I have shown the anti-glare device applied alone to the section 5. This section 5 is formed of crown glass, although it may be formed of other glass, Cellophane, or other transparent plastic material. The section 5 is molded to produce a 4° crown glass prism 7, the crown glass having an index of refraction of 1.539. The section 5 is also molded to form a cavity or chamber 8, which is prism-shaped in vertical cross-section. This prism-shaped cavity is filled with carbon disulfide ($CS_2$), as a liquid. This carbon disulfide has an index of refraction of 1.629. The cavity holds the carbon disulfide which directly contacts with the face or wall 9 of the prism and the face or wall 10 which is a plano. The carbon disulfide held within the cavity forms a liquid prism having an angle slightly below 4°. Since the degree or angle of the glass prism is 4° and the index of refraction of the crown glass is 1.539, the angle or degree of the liquid prism having the liquid of the higher index of refraction of 1.629 should be slightly below 4° so that the resultant refracting action of the two prisms will be substantially identical. This will prevent deviation of the object. While I have shown the two prisms as of substantially 4°, the angle or degree of either may be widely varied, provided the angle or degree of the companion prism is correspondingly varied, so that the two prisms will then have substantially identical resultant bending or refracting actions. The increased angle or degree of the prisms produce a more intense spectrum, but render the device more bulky. The cavity holds the carbon disulfide which directly contacts with the face or wall 9 of the prism and the face or wall 10 which is a plano. The carbon disulfide is therefore formed into a liquid prism having an angle of slightly less than 4°. The cavity may be filled with the liquid by passing the same through an opening 12 in the top subsequently to which the opening is closed or sealed. I use carbon disulfide on account of its high refractive index, and greater dispersion action. The solid and liquid prisms are disposed in superposed inverted relation. Where a solid prism is used, I have found that it is critical to have a liquid prism superposed upon the same as satisfactory results cannot be obtained by employing two superposed solid prisms. While satisfactory results have been obtained by the use of a liquid carbon disulfide prism of a freely flowing liquid, yet I contemplate using a liquid of high viscosity, or even a mass having a jelly-like consistency.

In the use of this anti-glare device, I have found that the white light from the source of light or object passing through the combined solid and liquid prisms, is refracted to produce the spectrum but this spectrum remains as such when passing from the superposed prisms and hence the blinding effect of the white light is eliminated. The spectrum will be produced if the white light is passed through one prism, but the object would be deviated to such an extent that the use of the device would not be practical upon an automobile or like vehicle. By the assembled solid and liquid prisms the deviation of the object is very slight and I believe that the angles of the two prisms can be so adjusted that the deviation of the objects will be practically eliminated. In Figure 3, the numeral 13 is the object or source of light and 14 is the ray of white light which first passes through the plano surface 10 and then through the liquid prism and is refracted as indicated at 11 to produce the spectrum and this light is again refracted in an opposite direction as indicated at 14', and comes out as indicated at 12' and the line 12' is parallel with the line 14, whereby the object observed near the eye will not be substantially deviated. It is a peculiar fact which I have discovered that the spectrum passing from the liquid prism into the solid glass prism remains as a spectrum although the spectrum is refracted. Experiments which I have conducted show that if two solid prisms are arranged in superposed inverted relation that the object will not be substantially deviated but the light finally passing from the two prisms will be white light and the spectrum lost. The reason for this action is not known but it may be that the liquid prism contacting the face 9 eliminates the air film or space which is invariably present where two glass prisms are arranged in superposed relation. While in the illustration given I have shown the liquid prism next to the object, yet I have found that the device operates just as well if the glass prism is arranged next to the object.

In Figures 4 to 6 inclusive, the windshield section which may be formed of Cellophane or other plastic material or glass is cast with cavities 15 and 16, which are prism-shaped in cross-section. Cavity 15 has a plano surface or wall 17 while the cavity 16 has a plano surface or wall 18, and there is a diagonal plano surface or wall 19 between these two cavities. The cavities are superposed and are inverted. The cavity 15 is filled with carbon disulfide as described in connection with the first form of the invention having an index of refraction of 1.629 and the other cavity 16 is filled with benzyl alcohol having an index of refraction of 1.539, or other clear liquids having similar indices of refraction and the cavities closed at 12. The plano surfaces or walls 17, 18, and 19 have no optical function and the white light from the object is refracted by the liquid carbon disulfide prism to produce the spectrum and the spectrum passes through the liquid benzyl alcohol prism and remains as such and the spectrum is refracted so that the object is not substantially deviated. This liquid benzyl alcohol prism has an angle of 4°, while the carbon disulfide prism will have an angle or degree slightly below 4°, so that the resultant light bending action of the two prisms will be substantially identical. In Figure 6, 20' is the object or source of light and the white light 20 passes into the first liquid prism and is refracted upwardly to produce the spectrum and the spectrum passes through the second liquid prism and is refracted downwardly and passes from the prism as such. The line of light 21 leaving the second prism is parallel with the line of light 20 whereby the object is not substantially deviated. While I have shown the two liquid prisms as formed of carbon disulfide and benzyl alcohol, I contemplate using other liquid or liquids having similar or suitable refractive properties. In this form of the invention the liquid or the liquid prisms directly contact with the plano surfaces eliminating air space between the prisms.

I also contemplate embodying the invention in a reflecting device or mirror, which may be used upon an automobile or the like, and when this is done the rear surface of the solid prism would be coated with the usual reflecting material used in making mirrors, as at 20ª, Figure 7.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, what I claim is:

1. A device for use in overcoming the glare from blinding lights consisting of two prisms, one prism having oppositely arranged flat faces having an angular degree of substantially 4° for producing a spectrum, said prism having an index of refraction of substantially 1.539, the other prism having oppositely arranged flat faces having an angular degree slightly lower than 4° to produce a spectrum, the second named prism having an index of refraction of substantially 1.629, the refracting angles of the prisms being below the critical angles of the individual prisms for preventing blurring of the object, the prisms having their inner faces overlapping in close relation and one prism being inverted with relation to the other prism, the outer faces of the assembled overlapping prisms forming the sides of the device, the arrangement being such that the action of the prism with the higher angular degree and lower index of refraction produces a lesser spectrum than the action of the prism with the lower angular degree and higher index of refraction whereby a resultant spectrum is obtained by the light passing through the sides of the overlapping prisms for overcoming the blinding effect of the light while the refracting action of the two overlapping prisms so neutralize each other that the deviation of the object is eliminated or substantially eliminated, and means to support the device in position in front of the eyes of the user so that the light passes through the sides of the device.

2. A device for use for overcoming the glare from blinding lights, comprising a solid prism formed of crown glass and having oppositely arranged angularly disposed flat faces disposed at 4° and having an index of refraction of 1.539, a liquid prism formed of carbon disulphide ($CS_2$) and having oppositely arranged angularly disposed flat faces arranged at slightly less than 4° and having an index of refraction of 1.629, the prisms being arranged in overlapping relation and inverted with respect to each other, the arrangement being such that the action of the crown glass prism having the lower index of refraction produces a lesser spectrum than the action of the liquid prism having the higher index of refraction whereby a resultant spectrum is obtained for overcoming the binding effect of light while the refracting action of the two prisms so neutralize each other that the deviation of the object is eliminated or substantially eliminated.

3. A device for use for overcoming the glare from blinding headlights, comprising a solid transparent prism having oppositely arranged angularly disposed flat faces, a liquid prism formed of carbon disulphide ($CS_2$) having oppositely arranged angularly disposed flat faces arranged at a slightly less angle than the arrangement of the flat faces of the solid prism, the liquid prism having a greater dispersion action than the solid prism and producing a greater spectrum than the solid prism, the prisms being arranged in overlapping relation and inverted with respect to each other, the refractive action of the two prisms being so similar that they substantially neutralize each other and deviation of the object is eliminated or substantially eliminated.

FRANCIS A. BRUNSON.